United States Patent Office 3,373,185
Patented Mar. 12, 1968

3,373,185
3,3',3''-NITRILOTRIS (1,2-PROPANEDIOL), HEXA-NITRATE AND METHOD FOR PREPARING SAME
Gerhard R. Wendt, Havertown, and Kurt W. Ledig, Philadelphia, Pa., assignors to American Home Products Corporation, New York, N.Y., a corporation of Delaware
No Drawing. Filed Jan. 17, 1967, Ser. No. 609,783
2 Claims. (Cl. 260—467)

ABSTRACT OF THE DISCLOSURE

A new compound, 3,3',3''-nitrilotris(1,2-propanediol), hexanitrate prepared by reacting triallylamine with iodine and silver nitrate, is useful as a vasodilator.

Background of invention

The invention relates generally to the art of chemistry and, more particularly, to the field of pharmaceutically active nitrated compounds which have utility as vasodilators.

Nitrated chemical compounds of certain classes are known which have said vasodilating activity. For example, the compounds 1,4,3,6 - dianhydro-sorbitol-2,5-dinitrate, trolnitrate phosphate and pentaerythritol tetranitrate have been found useful in this area.

Summary of invention

The novel nitrated compound of the present invention is 3,3',3''-nitrilotris (1,2-propanediol), hexanitrate, of the Formula I below:

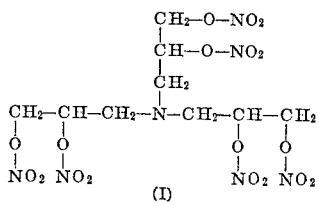

The compound (I) of the invention also has said desirable utility of functioning as a potent vasodilating agent.

The novel compound (I) may be prepared in a facile manner in accordance with the method aspect of the present invention. Thus, said compound (I) is prepared by reacting triallylamine with a suitable inorganic nitrating compound in a selected inert organic solvent, to which mixture is added a halogen. The general reaction may be illustrated schematically as follows:

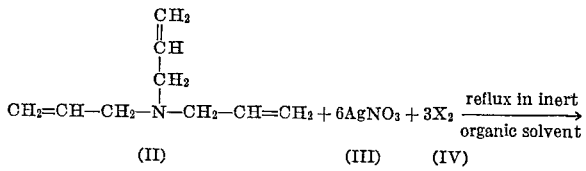

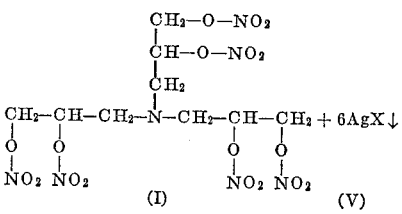

wherein X is selected from the group consisting of iodine and bromine.

Description of preferred embodiment

In the preparation of the compound (I), 3,3',3''-nitrilotris(1,2-propanediol), hexanitrate, of the invention in a preferred method, the nitrating agent is silver nitrate, the solvent is acetonitrile and the halogen is iodine. Preferably, the iodine is added increment-wise to the reaction solution containing the triallylamine and nitrating compound in the solvent, while the reaction solution is maintained at reflux temperature.

In the exercising of the method of the invention, the compound of Formula I used therein may be administered alone or in combination with pharmaceutically acceptable carriers, the proportion of which is determined by the chosen route of administration, and standard pharmaceutical practice. For example, it may be administered orally in the form of tablets or capsules, or as sublingual tablets, which may contain conventional excipients, or in the form of solutions; or it may be injected parenterally, that is intramuscularly, intravenously or subcutaneously. For parenteral administration, it may be used in the form of sterile solutions containing other solutes, for example, enough saline or glucose to make the solutions isotonic.

The dosage of the present therapeutic agent will vary with the form of administration. It will generally be found that when the composition is administered orally, larger quantities of the active agent will be required to produce the same effect as a smaller quantity given parenterally. In general, the compound of this invention is most desirably administered at a concentration level that will generally afford effective results without causing any harmful or deleterious side effects, and preferably at a level that is in the range of from about 0.1 mg. to about 10.0 mg. per kg. of body weight per day, although as aforementioned, variations will occur. However, a dosage level that is in the range of from about 0.5 mg. to about 8.0 mg. per kg. of body weight per day is most desirably employed in order to achieve effective results.

The following example is illustrative of the preparation of the novel compound useful in the method of invention and of the exercising of the latter, but is not to be considered necessarily limitative thereof:

*3,3',3''-nitrilotris (1,2-propanediol) hexanitrate*

A refluxing solution of 685 mg. of triallylamine, 40 ml. of acetonitrile, and 5.70 g. of silver nitrate was treated with 2.10 g. of iodine in small portions during the course of 1 hour. After an additional hour reflux, the precipitate was filtered and the filtrate poured into water. The reaction mixture was extracted with petroleum ether to remove starting material and finally the material extracted with ether. Chromatographic separation over Florex in chloroform and elution with acetone gave the title compound. For analysis the product was dried at 80° C. for six hours at $10^{-4}$ mm.

IR λ film 6.1, 7.8μ

Calcd: $C_9H_{15}N_7O_{18}$: N, 19.26 percent. Found: N, 18.5 percent.

We claim:
1. The compound 3,3',3''-nitrilotris (1,2-propanediol), hexanitrate.
2. A method for preparing the compound of claim 1, which method comprises refluxing a solution of triallylamine and silver nitrate in acetonitrile and adding iodine thereto incrementwise to result in the production of a precipitate of silver iodide, and thereafter isolating said compound of claim 1 from the solution remaining.

References Cited

UNITED STATES PATENTS

| | | | |
|---|---|---|---|
| 2,975,208 | 3/1961 | Myers et al. | 260—467 |
| 3,168,438 | 2/1965 | Halpern | 260—467 X |

L. DEWAYNE RUTLEDGE, *Primary Examiner.*

L. A. SEBASTIAN, *Assistant Examiner.*